US011823167B2

United States Patent
Fort et al.

(10) Patent No.: US 11,823,167 B2
(45) Date of Patent: Nov. 21, 2023

(54) SYSTEMS AND METHODS FOR DETERMINING TRANSACTION LOCATIONS

(71) Applicant: Capital One Services, LLC, McLean, VA (US)

(72) Inventors: Pavel Fort, Westbury, NY (US); Andrew Veenstra, San Francisco, CA (US); Natasha Mitchko, New York, NY (US)

(73) Assignee: Capital One Services, LLC, McLean, VA (US)

( * ) Notice: Subject to any disclaimer, the term of this patent is extended or adjusted under 35 U.S.C. 154(b) by 76 days.

(21) Appl. No.: 17/395,629

(22) Filed: Aug. 6, 2021

(65) Prior Publication Data
US 2023/0040141 A1 Feb. 9, 2023

(51) Int. Cl.
*G06Q 20/32* (2012.01)
*H04W 4/029* (2018.01)

(52) U.S. Cl.
CPC ........ *G06Q 20/3224* (2013.01); *H04W 4/029* (2018.02)

(58) Field of Classification Search
None
See application file for complete search history.

(56) References Cited

U.S. PATENT DOCUMENTS

| 8,062,116 | B2 * | 11/2011 | Lutnick | G07F 17/3225 463/25 |
| 9,589,259 | B2 * | 3/2017 | McNeel | G06Q 20/202 |
| 9,680,942 | B2 * | 6/2017 | Dimmick | H04L 67/52 |
| 11,182,794 | B1 * | 11/2021 | Aument | G06Q 20/3278 |
| 2012/0239479 | A1 * | 9/2012 | Amaro | H04W 4/021 709/204 |
| 2014/0040139 | A1 * | 2/2014 | Brudnicki | G06Q 20/3224 705/44 |
| 2014/0279494 | A1 | 9/2014 | Wiesman et al. | |
| 2014/0279533 | A1 * | 9/2014 | Hamilton | G06Q 40/00 705/35 |

(Continued)

OTHER PUBLICATIONS

Antczak, T., & Weron, R. (2019). Point of sale (POS) data from a supermarket: transactions and cashier operations. Data, 4(2), 67. (Year: 2019).*

(Continued)

*Primary Examiner* — Daniel S Felten
*Assistant Examiner* — Claire A Rutiser
(74) *Attorney, Agent, or Firm* — Banner & Witcoff, Ltd.

(57) ABSTRACT

Systems and methods for determining transaction locations are disclosed. In one embodiment, a method includes receiving, from a computing terminal, information indicating the completion of a transaction associated with a mobile device, sending, to the mobile device, a confirmation of the completion of the transaction, receiving, from the mobile device, location information indicating latitude and longitude information of the mobile device, confirming that the location information is within a predetermined distance of a stored location of the computing terminal, updating the location information associated with the computing terminal to include the received location information, and determining, based on the location information associated with the computing terminal, a location of the computing terminal.

20 Claims, 5 Drawing Sheets

(56) References Cited

U.S. PATENT DOCUMENTS

| | | | | |
|---|---|---|---|---|
| 2015/0081349 | A1* | 3/2015 | Johndrow | G06Q 20/405 705/5 |
| 2015/0161603 | A1* | 6/2015 | Fish | G06Q 20/20 705/44 |
| 2015/0356662 | A1* | 12/2015 | Poole | G06Q 30/0633 705/26.8 |
| 2016/0132857 | A1* | 5/2016 | Unser | G06Q 20/12 705/39 |
| 2016/0171499 | A1* | 6/2016 | Meredith | G06Q 20/4016 705/44 |
| 2016/0260104 | A1* | 9/2016 | Iannace | G06Q 30/0205 |
| 2016/0321642 | A1* | 11/2016 | Kaufman | H04W 8/14 |
| 2016/0371697 | A1* | 12/2016 | Auvenshine | G06Q 20/3224 |
| 2017/0091765 | A1* | 3/2017 | Lloyd | G06Q 20/321 |
| 2017/0109844 | A1* | 4/2017 | Brown | G06Q 20/40 |
| 2017/0357971 | A1* | 12/2017 | Pitz | H04W 4/021 |
| 2018/0005243 | A1* | 1/2018 | Zovi | G06Q 20/405 |
| 2018/0039975 | A1* | 2/2018 | Hefetz | G06Q 20/4014 |
| 2018/0137506 | A1* | 5/2018 | Kcl | G06Q 20/401 |
| 2018/0158055 | A1* | 6/2018 | Buhrmann | G06Q 20/326 |
| 2019/0034903 | A1* | 1/2019 | Arora | G06Q 20/02 |
| 2019/0057374 | A1 | 2/2019 | Hernandez-Ellsworth et al. | |
| 2019/0087810 | A1* | 3/2019 | Dopkeen | G06Q 20/3278 |
| 2019/0107969 | A1* | 4/2019 | Vandewater | G06F 3/0679 |
| 2020/0005295 | A1* | 1/2020 | Murphy | G06Q 20/405 |
| 2020/0112824 | A1* | 4/2020 | Phillips | H04W 4/021 |
| 2020/0126060 | A1* | 4/2020 | Hefetz | G06Q 20/3224 |
| 2020/0234297 | A1* | 7/2020 | Murray | G06Q 20/3278 |
| 2021/0108935 | A1* | 4/2021 | Koohi | G01S 19/52 |
| 2021/0240994 | A1* | 8/2021 | Maan | G06Q 20/3224 |
| 2021/0357940 | A1* | 11/2021 | Benkreira | H04W 12/08 |
| 2021/0374704 | A1* | 12/2021 | Cummins | G07G 5/00 |
| 2022/0272159 | A1* | 8/2022 | Samuel | G06Q 30/04 |

OTHER PUBLICATIONS

Dec. 1, 20222—(EP) Extended European Search Report—App No. 22189141.9.

\* cited by examiner

SYSTEMS AND METHODS FOR DETERMINING TRANSACTION LOCATIONS

TECHNICAL FIELD

Aspects described herein generally relate to digital processing systems and more specifically to automatically determining device locations using machine classifiers.

BACKGROUND

A point of sale (POS) device is a hardware system for processing card payments at retail locations. POS devices can be installed in fixed locations and/or include portable terminals capable of contact and contactless processing of payment cards.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems and methods for determining transaction locations in accordance with embodiments of the invention are disclosed. In one embodiment, a computer-implemented method includes receiving, from a computing terminal, information indicating the completion of a transaction associated with a mobile device, sending, to the mobile device, a confirmation of the completion of the transaction, receiving, from the mobile device, location information indicating latitude and longitude information of the mobile device, confirming that the location information is within a predetermined distance of a stored location of the computing terminal, updating the location information associated with the computing terminal to include the received location information, and determining, based on the location information associated with the computing terminal, a location of the computing terminal.

In yet another embodiment of the invention, the method further includes calculating, based on a number of members in the set of location information, a confidence factor for the determined location of the computing terminal.

In still another embodiment of the invention, the method further includes storing the determined location of the computing terminal and the confidence factor.

In yet still another embodiment of the invention, calculating the confidence factor is further based on a calculated deviation between location information of the members of the set.

In yet another additional embodiment of the invention, the location information further includes attribute information relating to the transaction.

In still another additional embodiment of the invention, the method further includes determining the location of the computing terminal includes clustering, based on associated attribute information, members of the set of location information, identifying, based on the clustering, a centroid, and utilizing the centroid as the determined location of the computing terminal.

In yet still another additional embodiment of the invention, the method further includes determining that a stored location of the computing terminal differs from the determined location of the computing terminal and replacing the stored location of the computing terminal with the determined location of the mobile device.

In yet another embodiment of the invention, the method further includes determining that a confidence factor associated with a stored location of the computing terminal is lower than a confidence factor associated the determined location of the computing terminal and updating the stored location of the computing terminal with the determined location of the computing terminal.

In still another embodiment of the invention, the method further includes determining, based on the determined location, a street address associated with the computing terminal.

Yet another embodiment of the invention includes a device including one or more processors and memory configured to store computer instructions that, when executed by the one or more processors, cause the device to receive, from a computing terminal, information indicating the completion of a transaction associated with a mobile device, send, to the mobile device, a confirmation of the completion of the transaction, receive, from the mobile device, location information, wherein the location information includes latitude and longitude information, confirm that the location information is within a predetermined distance of a stored location of the computing terminal, store, at a database, the location information as part of a set of location information that is associated with the computing terminal, determine, based on the set of location information that is associated with the computing terminal, a location of the computing terminal, and update the stored location of the computing terminal with the determined location of the computing terminal.

In yet another embodiment of the invention, the computing instructions further cause the device to determine the location of the computing terminal by clustering, based on associated attribute information, members of the set of location information, identifying, based on the clustering, a centroid, and utilizing the centroid as the determined location of the computing terminal.

In still another embodiment of the invention, the location information further includes attribute information relating to the transaction.

In yet still another embodiment of the invention, the computer instructions further cause the device to prior to the update, determine that the stored location of the computing terminal differs from the determined location of the computing terminal.

In yet another additional embodiment of the invention, the computer instructions further cause the device to, prior to the update, determine that a confidence factor associated with a stored location of the computing terminal is lower than a confidence factor associated the determined location of the computing terminal.

In still another additional embodiment of the invention, the stored computer instructions further cause the device to calculate of a confidence factor associated with the determined location of the mobile device.

Still another embodiment of the invention includes a non-transitory computer readable medium storing computer instruction that, when executed by one or more processors, cause performance of actions including receiving, from a computing terminal, information indicating the completion of a transaction associated with a mobile device, sending, to the mobile device, a confirmation of the completion of the transaction, receiving, from the mobile device, location information, wherein the location information includes latitude and longitude information, confirming that the location information is within a predetermined distance of a stored location of the computing terminal, storing, at a database, the location information as part of a set of location information that is associated with the computing terminal, determining, based on the set of location information that is associated with the computing terminal, a location of the computing terminal, calculating, based on a number of members in the set of location information, a confidence factor for the determined location of the computing terminal, determining that a confidence factor associated with a stored location of the computing terminal is lower than a confidence factor associated the determined location of the computing terminal, and updating the stored location of the computing terminal with the determined location of the computing terminal.

In yet another additional embodiment of the invention, the computer instructions are further configured to cause the calculating of the confidence factor based on a calculated deviation between location information of the members of the set.

In still another additional embodiment of the invention, the computer instructions are further configured to cause determining that a stored location of the computing terminal differs from the determined location of the computing terminal.

In yet still another additional embodiment of the invention, the location information further includes attribute information relating to the transaction.

In yet another embodiment of the invention, the computer instructions are further configured to cause determining of the location of the computing terminal by clustering, based on associated attribute information, members of the set of location information and identifying, based on the clustering, a centroid.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the claims.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure can be practiced. It is to be understood that other embodiments can be utilized and structural and functional modifications can be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

In general, determining and/or confirming the location of a merchant based on transaction information is a difficult problem. Merchants may use point of sale devices with unclear or inaccurate names, and transaction data provided by the merchant may include identifiers that are meaningless strings of symbols and/or abbreviations in a non-standardized format. The transaction data typically indicates a merchant name and a city and/or zip code. However, many merchants have several locations in the same city/zip code (sometimes even on the same street/intersection) and the transaction data does not uniquely identify which location at which the transaction was executed. Global positioning system (GPS) receivers can be used to determine the location of particular merchants. However, GPS receivers are inherently inaccurate and merchants can be located very close together. Due to this inaccuracy of GPS receivers, it can be hard to determine the location of a particular merchant device in dense areas.

Systems and methods in accordance with embodiments of the invention can determine transaction locations based on location information provided by related mobile devices. A point of sale (POS) device can be used to make a purchase and transaction data can be sent to a transaction analysis server system. The transaction analysis server system can send a transaction confirmation to a mobile device associated with the purchaser. The mobile device can generate location data and provide the location data to the transaction analysis server system. The transaction analysis server system can generate clusters of transactions occurring at the same POS device and/or other POS devices registered to that particular merchant. The centroid location of the mobile device locations associated with the POS device(s) can be determined and this centroid location can be used as the physical location of the merchant. In this way, the averaging the locations across multiple GPS coordinates smooths out the errors inherent in the location data for any particular mobile device and greatly improves the accuracy of the determined merchant locations.

Operating Environments and Computing Devices

Figure 1:
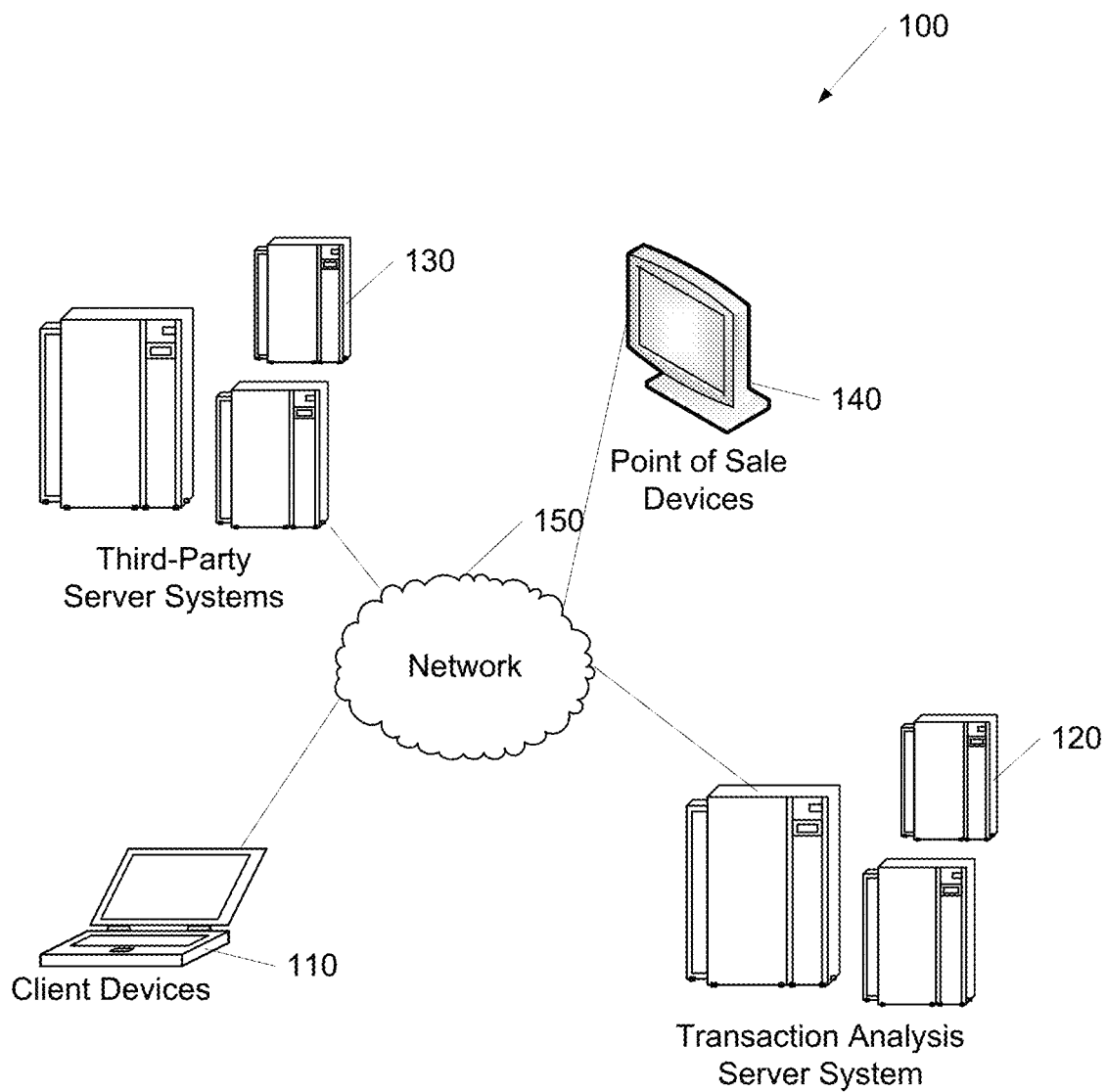
FIG. 1 shows an example of an operating environment in which one or more aspects described herein may be implemented.

FIG. 1 shows an operating environment 100. The operating environment 100 can include at least one client device 110, at least one transaction analysis server system 120, at least one third-party server system 130, and/or at least one point of sale device 140 in communication via a network 150. It will be appreciated that the network connections shown are illustrative and any means of establishing a communications link between the computers can be used. The existence of any of various network protocols such as TCP/IP, Ethernet, FTP, HTTP and the like, and of various wireless communication technologies such as GSM, CDMA, WiFi, and LTE, is presumed, and the various computing devices described herein can be configured to communicate using any of these network protocols or technologies. Any of the devices and systems described herein can be implemented, in whole or in part, using one or more computing systems described with respect to FIG. 2.

Client devices 110 can execute transactions, obtain transaction confirmations, and/or provide location data as described herein. Transaction analysis server system 120 can obtain transaction data and/or location data, determine point of sale device locations, and/or provide instructions to third-party systems as described herein. Third-party server systems 130 can provide a variety of merchant data as described herein. Point of sale devices 140 can execute transactions and/or provide transaction data as described herein. However, it should be noted that any computing device in the operating environment 100 can perform any of the processes and/or store any data as described herein. The computing devices can be publicly accessible and/or have restricted access. Access to a particular computing device can be limited based on access requirements for computing devices requesting access to the particular computing device.

Some or all of the data described herein can be stored using one or more databases. Databases can include, but are not limited to relational databases, hierarchical databases, distributed databases, in-memory databases, flat file databases, XML databases, NoSQL databases, graph databases, and/or a combination thereof Any file system can be used to store data using a database and/or flat file as appropriate. The network 150 can include a local area network (LAN), a wide area network (WAN), a wireless telecommunications network, and/or any other communication network or combination thereof Processing server systems 130 and/or database server systems can include systems that perform computations on multiple CPUs or GPUs along with serverless environments that mirror recursive function calls. For example, a server system can include a variety of processing nodes, each processing node assigned to execute a single sub-query. The processing nodes can include distinct computing devices and/or virtualized computing devices executing on a single computing device. In this way, the server system can process each sub-query in parallel as described herein.

The data transferred to and from various computing devices in operating environment 100 can include secure and sensitive data, such as confidential documents, customer personally identifiable information, and account data. Therefore, it can be desirable to protect transmissions of such data using secure network protocols and encryption, and/or to protect the integrity of the data when stored on the various computing devices. A file-based integration scheme or a service-based integration scheme can be utilized for transmitting data between the various computing devices. Data can be transmitted using various network communication protocols. Secure data transmission protocols and/or encryption can be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services can be implemented within the various computing devices. Web services can be accessed by authorized external devices and users to support input, extraction, and manipulation of data between the various computing devices in the operating environment 100. Web services built to support a personalized display system can be cross-domain and/or cross-platform, and can be built for enterprise use. Data can be transmitted using the Secure Sockets Layer (SSL) or Transport Layer Security (TLS) protocol to provide secure connections between the computing devices. Web services can be implemented using the WS-Security standard, providing for secure SOAP messages using XML encryption. Specialized hardware can be used to provide secure web services. Secure network appliances can include built-in features such as hardware-accelerated SSL and HTTPS, WS-Security, and/or firewalls. Such specialized hardware can be installed and configured in the operating environment 100 in front of one or more computing devices such that any external devices can communicate directly with the specialized hardware.

Figure 2:
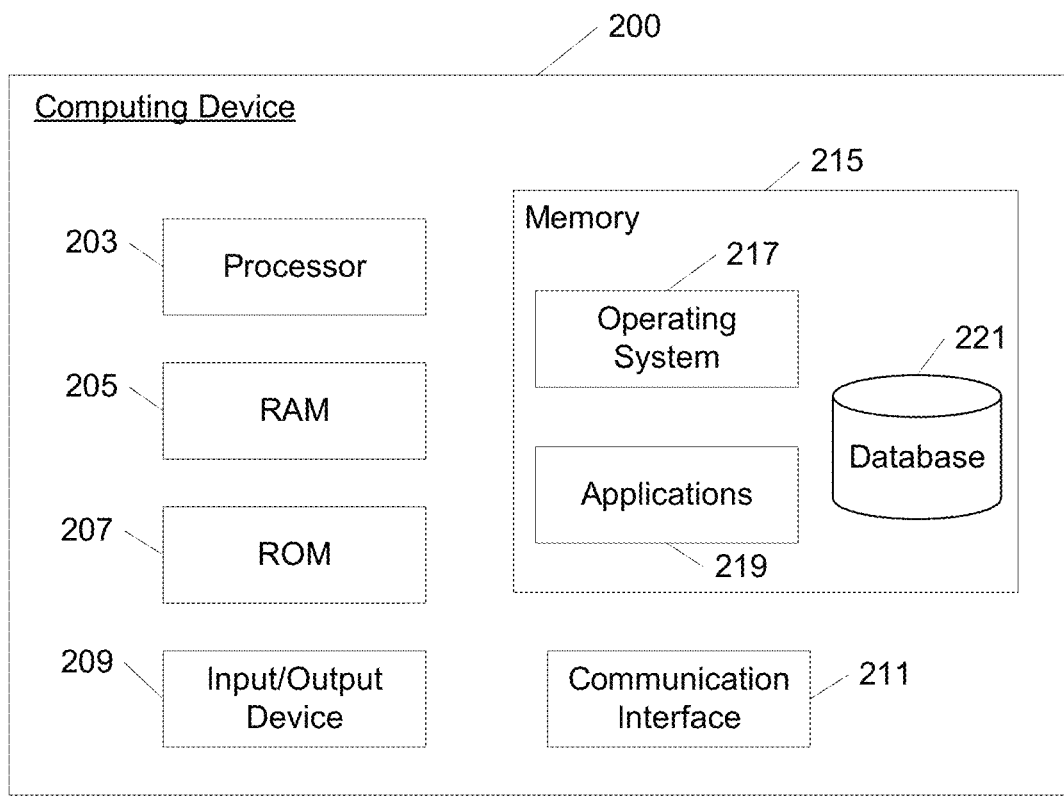
FIG. 2 shows an example computing device in accordance with one or more aspects described herein.

Turning now to FIG. 2, a conceptual illustration of a computing device 200 that can be used to perform any of the techniques as described herein is shown. The computing device 200 can include a processor 203 for controlling overall operation of the computing device 200 and its associated components, including RAM 205, ROM 207, input/output device 209, communication interface 211, and/or memory 215. A data bus can interconnect processor(s) 203, RAM 205, ROM 207, memory 215, I/O device 209, and/or communication interface 211. In some embodiments, computing device 200 can represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 can include a microphone, keypad, touch screen, and/or stylus through which a user of the computing device 200 can provide input, and can also include one or more of a speaker for providing audio output and a video display device for providing textual, audiovisual, and/or graphical output. Software can be stored within memory 215 to provide instructions to processor 203 allowing computing device 200 to perform various actions. Memory 215 can store software used by the computing device 200, such as an operating system 217, application programs 219, and/or one or more databases 221. The various hardware memory units in memory 215 can include volatile and nonvolatile, removable and non-removable media implemented in any method or technology for storage of information such as computer-readable instructions, data structures, program modules, or other data. Memory 215 can include one or more physical persistent memory devices and/or one or more non-persistent memory devices. Memory 215 can include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that can be used to store the desired information and that can be accessed by processor 203.

Communication interface 211 can include one or more transceivers, digital signal processors, and/or additional circuitry and software for communicating via any network, wired or wireless, using any protocol as described herein. It will be appreciated that the network connections shown are illustrative and any means of establishing a communications link between the computers can be used. The existence of any of various network protocols such as TCP/IP, Ethernet, FTP, HTTP and the like, and of various wireless communication technologies such as GSM, CDMA, WiFi, and LTE, is presumed, and the various computing devices described herein can be configured to communicate using any of these network protocols or technologies.

Processor 203 can include one or more central processing units (CPU) and/or graphic processing units (GPU), which can include a single-core or multi-core processor along with multiple processors. Processor(s) 203 and associated components can allow the computing device 200 to execute a series of computer-readable instructions to perform some or all of the processes described herein. Although not shown in FIG. 2, various elements within memory 215 or other components in computing device 200, can include one or more caches including, but not limited to, CPU caches used by the processor 203, page caches used by the operating system 217, disk caches of a hard drive, and/or database caches used to cache content from database 221. For embodiments including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a database 221 is cached in a separate smaller database in a memory separate from the database, such as in RAM 205 or on a separate computing device. For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of devices, systems, and methods described herein, such as faster response times and less dependence on network conditions when transmitting and receiving data.

Although various components of computing device 200 are described separately, functionality of the various components can be combined and/or performed by a single component and/or multiple computing devices in communication without departing from the invention.

Determining Transaction Locations

As described herein, transaction locations based on location information provided by related mobile devices. A point of sale (POS) device can be used to make a purchase and transaction data can be sent to a transaction analysis server system. The transaction analysis server system can send a transaction confirmation to a mobile device associated with the purchaser. The mobile device can generate location data and provide the location data to the transaction analysis server system. The transaction analysis server system can generate clusters of transactions occurring at the same POS device (or other POS devices registered to that particular merchant). The centroid location of the mobile device locations associated with the POS device(s) can be determined and this centroid location can be used as the physical location of the merchant. In this way, the averaging the locations across multiple GPS coordinates smooths out the errors inherent in the location data for any particular mobile device and greatly improves the accuracy of the determined merchant locations.

Figure 3:
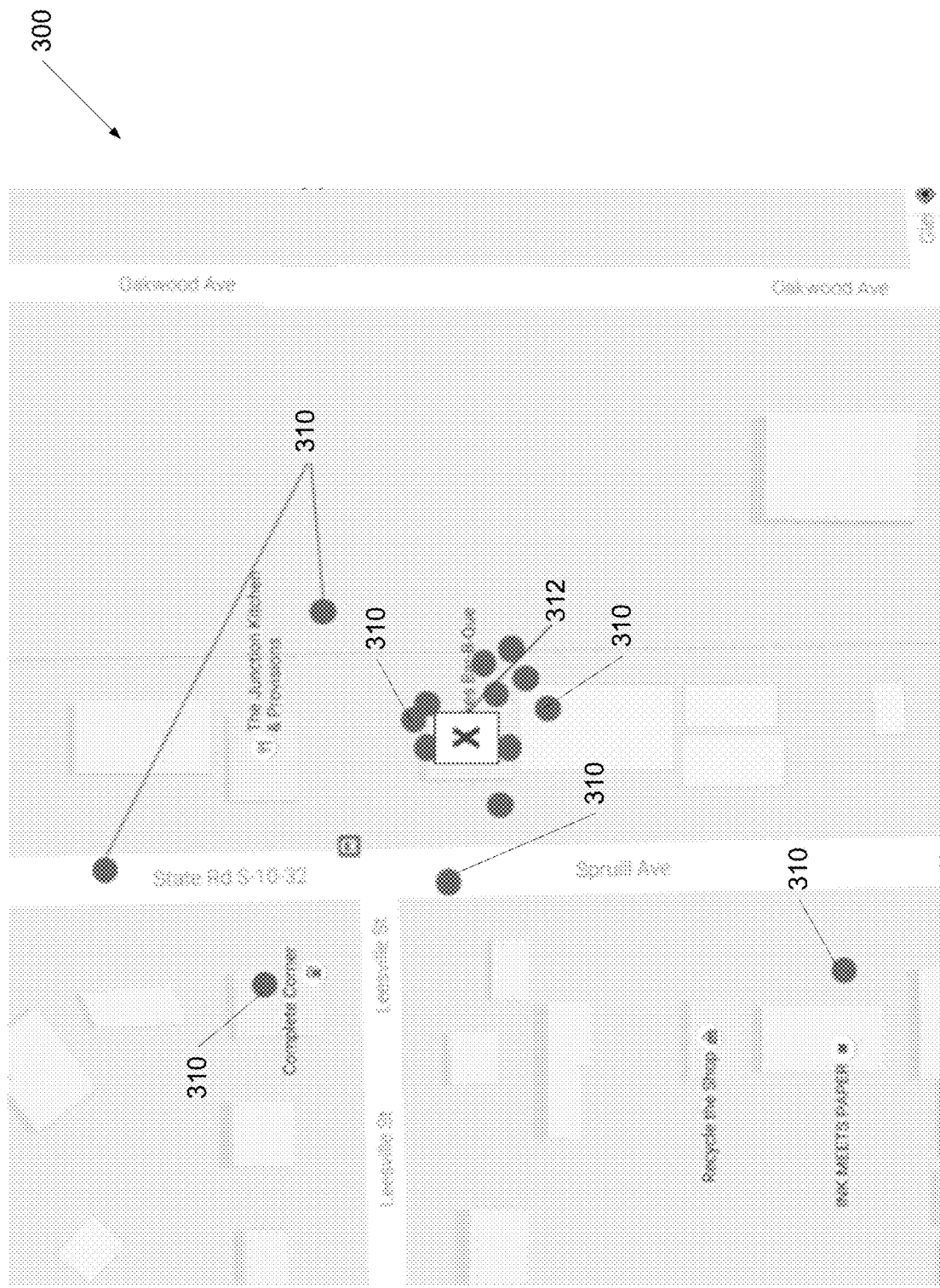
FIG. 3 shows an example location map according to one or more aspects of the disclosure.

FIG. 3 shows an example location map according to one or more aspects of the disclosure. Location map 300 includes a variety of mobile device location points 310, indicated by circles, and a determined merchant location 312. The mobile device location points 310 can include GPS location data provided by a mobile device associated with a transaction conducted at the merchant. As shown in location map 300, the location points 310 can include a variety of locations far from the merchant, including different merchants. The determined merchant location 312 can be calculated based on the location points 310 as described in more detail herein. The determined merchant location 312 can be provided to a variety of third-party server systems to determine a merchant name and/or any other data regarding the merchant. In many embodiments, the determined merchant location 312 can be used to update and/or correct a physical location of the merchant as stored by any of the computing devices described herein, including the third-party server systems.

In several embodiments, the determined merchant location 312 can be determined based on a centroid calculated based on the location points 310. The centroid can be can be determined using machine learning and/or distance measurement techniques as described herein. The determined merchant location 312 can also include a confidence metric indicating the likelihood that the determined merchant location 312 corresponds to the physical (e.g. ground truth) location of the merchant.

Figure 4:
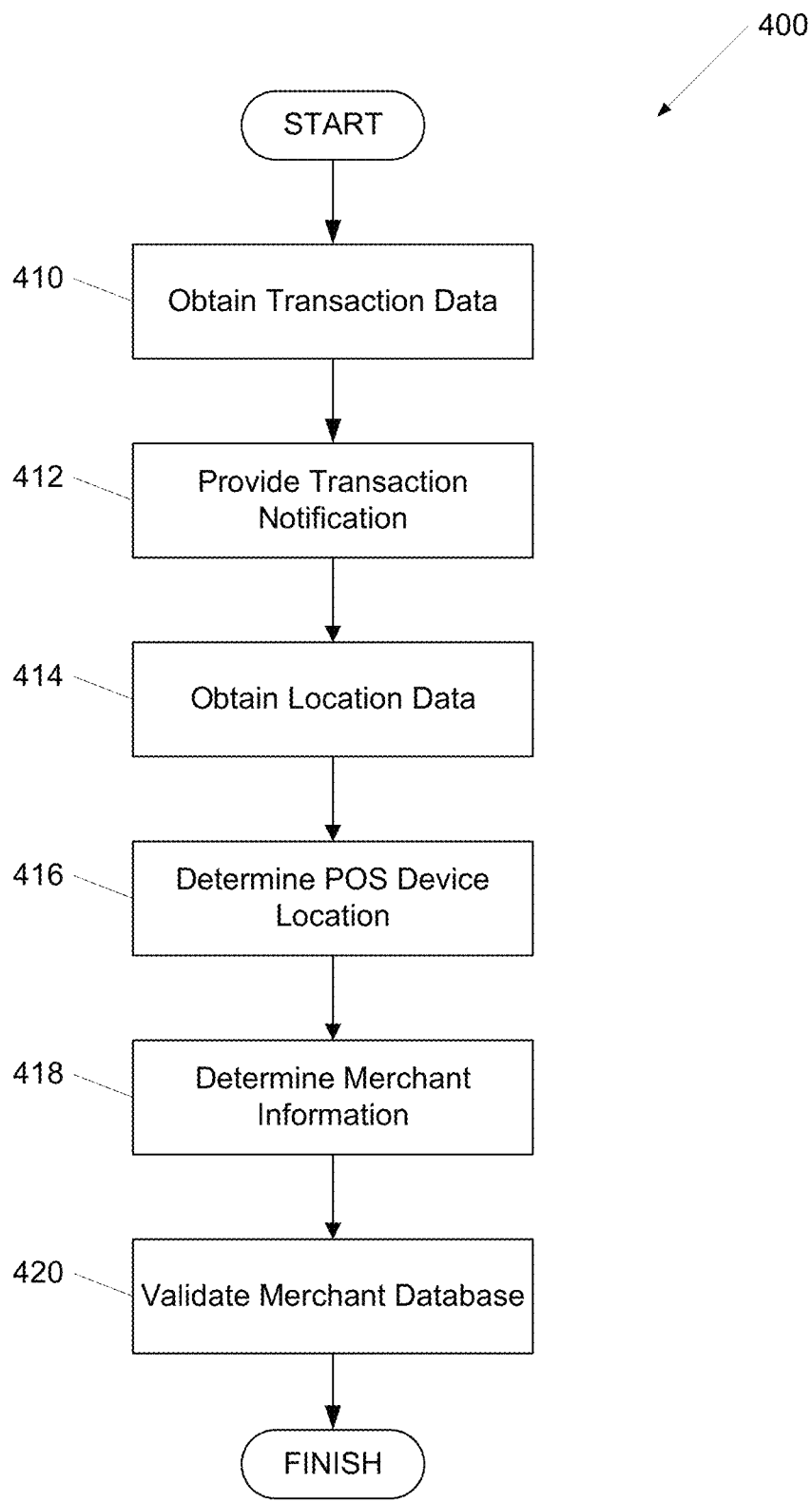
FIG. 4 shows a flow chart of a process for determining transaction locations according to one or more aspects of the disclosure.

FIG. 4 shows a flow chart of a process for determining transaction locations according to one or more aspects of the disclosure. Some or all of the steps of process 400 may be performed using one or more computing devices as described herein. In a variety of embodiments, some or all of the steps described below may be combined and/or divided into sub-steps as appropriate.

At step 410, transaction data can be obtained. The transaction data can be obtained by a transaction analysis server system. The transaction data can be provided by a point of sale device. The transaction data can include a merchant name, location information such as, but not limited to, city name, zip code, state, and the like, a transaction identifier, price information, shopping cart information, date and/or time information, and/or any other information associated with the transaction. In a variety of embodiments, the transaction data includes payment card information and/or any other identifier indicating a user associated with the transaction.

At step 412, a transaction notification can be provided. The transaction notification can be provided to a mobile device associated with the user. The transaction notification can be provided by a transaction analysis server system. The transaction notification can indicate the transaction indicated in the transaction data, the time at which the transaction occurred, the merchant name, and/or any other information as appropriate.

At step 414, location data can be obtained. The location data can be obtained from the mobile device. The location data can be obtained by the transaction analysis server system. The location data can include a latitude and/or longitude of the mobile device. The location data can be generated based on location data provided by a GPS receiver, cell tower triangulation, enhanced GPS, and/or any other location determination techniques as appropriate. The location data can indicate a time at which the location data was determined, an accuracy measurement associated with the location measurement, a speed and/or acceleration of the mobile device, and/or any other data regarding the operation of the mobile device. In several embodiments, the location data includes one or more characteristics of the mobile device, such as but not limited to a make of the mobile device, a model of the mobile device, an operating system version, a firmware version, and any other characteristics or properties of the mobile device and/or software stored on or executing on the mobile device.

At step 416, a POS device location can be determined. The POS device location can be determined based on the location data and/or historical location data. The historical location data can be location data for previous transactions associated with the POS device and obtained from one or more mobile devices. A variety of techniques for determining the POS device location are described in more detail with respect to FIG. 5. The POS device location can include a latitude and longitude (or any other coordinates).

At step 418, merchant information can be determined. In many embodiments, the merchant information can be determined based on the POS device location. In several embodiments, the merchant information is obtained from a third-party database that converts geographic coordinates to address information. The address information can be mapped to a merchant known to be located at the address. In a variety of embodiments, the merchant information is obtained from a third-party database that converts geographic coordinates to merchant information.

At step 420, a merchant database can be validated. The merchant database can store mappings of merchant names to geographic coordinates, addresses, point of sale devices, and/or any other data related to the merchant as appropriate. In many embodiments, the address and/or geographic coordinates associated with a merchant can be updated based on the determined POS device location and/or merchant information. For example, a POS device may be registered to a first merchant and purchased by a second merchant. However, the second merchant may fail to update the POS device so that the POS device, while in use by the second merchant, remains configured to associate transactions with the first merchant. In several embodiments, a POS device can be updated to indicate the merchant, address, and/or geographic coordinates. In this way, the POS device can be automatically updated to be registered to the merchant.

Figure 5:
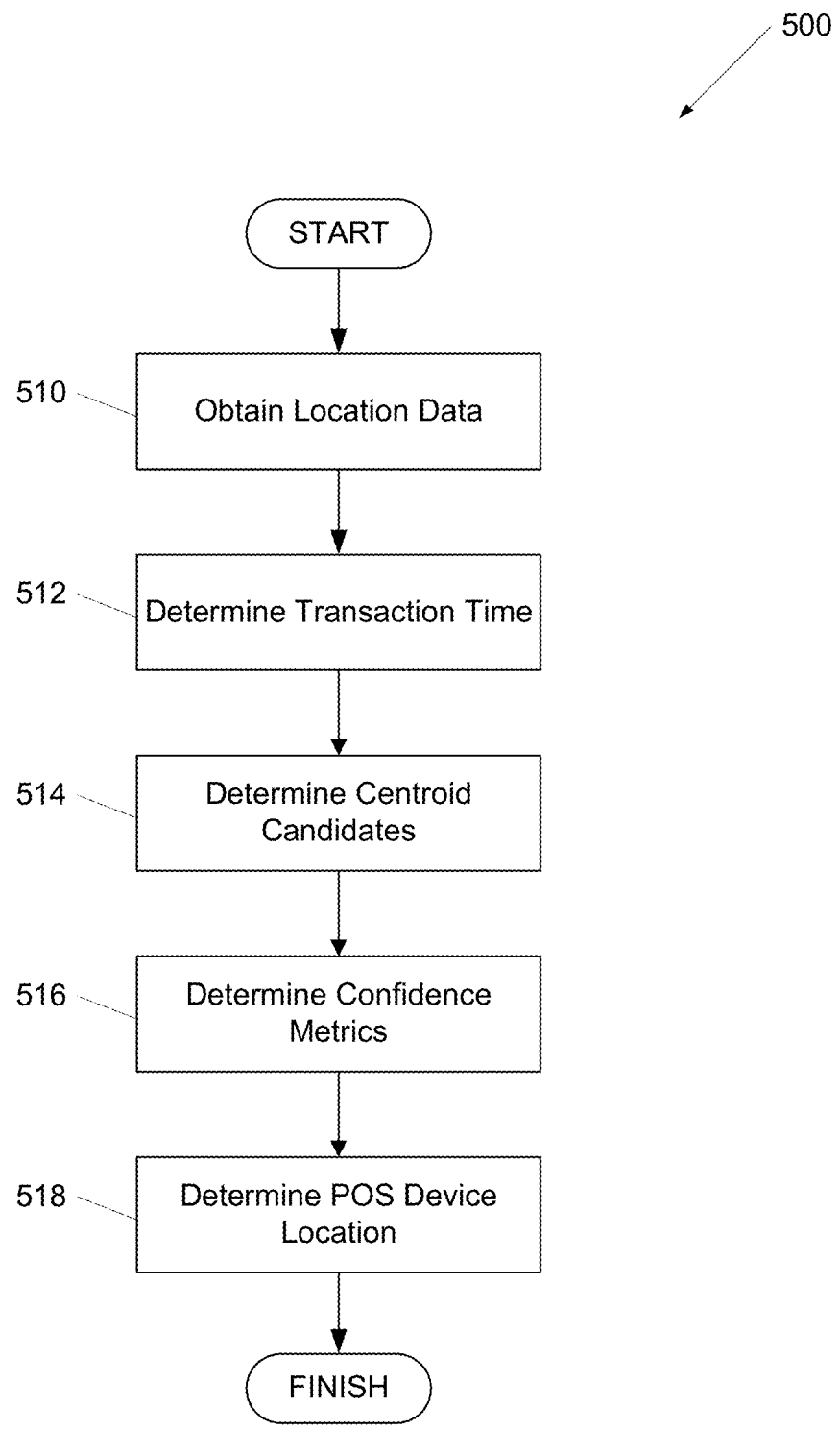
FIG. 5 shows a flow chart of a process for processing location data according to one or more aspects of the disclosure.

FIG. 5 shows a flow chart of a process for processing location data according to one or more aspects of the disclosure. Some or all of the steps of process 500 may be performed using one or more computing devices as described herein. In a variety of embodiments, some or all of the steps described below may be combined and/or divided into sub-steps as appropriate.

At step 510, location data can be obtained. The location data can be obtained from a mobile device as described herein. The location data can indicate geographic coordinates, a time at which the location data was generated, speed and/or acceleration information associated with a mobile device, and/or any other information as described herein. The location data can also include a set of historical location data for transactions associated with the same merchant and/or POS device.

At step 512, a transaction time can be determined. The transaction time can indicate when a transaction occurred. In many embodiments, the location data is generated in response to the transaction occurring as described herein. The transaction time can be generated by the POS device associated with the transaction.

At step 514, centroid candidates can be determined. A centroid candidate can be a geographic location that corresponds to a central location and/or a true location of the point of sale device based on the location data. The centroid candidates can be determined from the geographic coordinates indicated in the transaction data. It should be noted that, for a particular transaction, there may be a difference in time between the transaction occurring and the location data being generated by the associated mobile device. During this delay, there can be movement of the mobile device relative to the point of sale device. Accordingly, the weighting of a geographic coordinate (and/or the geographic coordinate itself) associated with a particular transaction can be adjusted based on the movement of the mobile device (as indicated by the speed and/or acceleration of the mobile device) and/or the difference between the transaction time and the time associated with the location data. In this way, the location data can be corrected to account for movement of the mobile device. Additionally, different mobile devices may differ in the accuracy of measured geographic coordinates. In several embodiments, the location data can be adjusted based on the characteristics of the mobile device to correct for the differences in accuracy between different mobile devices. In a variety of embodiments, multiple centroid candidates can be determined based on different subsets of geographic coordinates. For example, subsets of coordinates can be determined based on the difference in time between the transaction time and the time the geographic coordinates were provided. In another example, the subsets of coordinates can be determined based on the distance between the expected location of the POS device and the geographic coordinates. Each subset of coordinates can be evaluated to determine a potential centroid location. However, it should be noted that a subset of coordinates can be determined based on any attribute (and/or combination of attributes) of any data as described herein. In a variety of embodiments, the subset of geographic coordinates is treated as a cluster of data points in a space (e.g. Euclidian space) and the calculated candidate centroids correspond to one or more centroids of the cluster within the space.

At step 516, confidence metrics can be determined. A confidence metric can indicate a likelihood that a particular centroid candidate corresponds to the actual location (e.g. ground truth location) of the merchant. The confidence metric for a particular centroid candidate can be determined based on the geographic coordinates, the time difference in the generation of the geographic coordinates, the speed and/or acceleration of the mobile device, and/or the accuracy of the mobile device. In this way, the confidence metric can indicate a likelihood that the calculated centroid corresponds to the ground truth location of the merchant taking into account the uncertainty in the underlying geographic coordinates based on measurement error and/or movement of the mobile device providing the geographic coordinates.

In a variety of embodiments, the centroid candidates are determined based on an arithmetic mean of the geographic coordinates weighted by the time difference and/or accuracy of the geographic coordinates. In a number of embodiments, the centroid candidates and/or confidence metrics are determined using one or more machine learning classifiers. The machine learning classifiers can be trained based on a set of training data including a set of geographic coordinates and a ground truth location of a point of sale device. The machine learning classifier can take, as input, a set of geographic coordinates and output one or more centroid candidates and a confidence metric associated with each centroid candidate. It should be readily apparent to one having ordinary skill in the art that a variety of machine classifiers can be utilized including (but not limited to) decision trees, k-nearest neighbors, support vector machines (SVM), neural networks (NN), recurrent neural networks (RNN), convolutional neural networks (CNN), and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers can be utilized, more specific machine classifiers when available, and general machine classifiers at other times can further increase the accuracy of the generated centroid candidates and/or confidence metrics.

At step 518, a POS device location can be determined. In many embodiments, the POS device location is determined based on the determined centroid candidates and the determined confidence metrics. In a variety of embodiments, the centroid candidate with the highest confidence metric is selected as the POS device location. In many embodiments, the POS device location is randomly selected from the determined centroid candidates. In a number of embodiments, the centroid candidate that has the greatest number of geographic coordinates within a radius (either pre-determined and/or determined automatically) of the centroid candidate is selected as the POS device location. However, it should be noted that any of the centroid candidates can be selected as the POS device location as appropriate to the requirements of specific applications of embodiments of the invention. In a variety of embodiments, the POS device location can be refined based on mapping data related to the determined geographic location. For example, if the POS device location corresponds to the middle of a street, the POS device location can be adjusted to correspond to the nearest physical building.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied, in whole or in part, in firmware or hardware equivalents such as integrated circuits, field programmable gate arrays (FPGA), and the like. Particular data structures may be used to implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method for automatically registering point-of-sale systems with a merchant, the method comprising:
   receiving, from a computing terminal, information indicating the completion of a transaction associated with a mobile device, wherein the computing terminal stores first merchant data associated with a first merchant;
   sending, to the mobile device, a confirmation of the completion of the transaction;
   receiving, from the mobile device, location information, determined via a global positioning system of the mobile device, indicating latitude and longitude information of the mobile device;
   determining, based on the location information, a location of the computing terminal;
   determining that the computing terminal stores data corresponding to an incorrect merchant by identifying, based on the location of the computing terminal, a second merchant that is different from the first merchant; and
   transmitting, to the computing terminal, instructions that cause the computing terminal to replace the first merchant data stored by the computing terminal by causing the computing terminal to store second merchant data associated with the second merchant.

2. The computer-implemented method of claim 1, wherein determining the location of the computing terminal comprises:
   storing, at a database, the location information as part of a set of location information that is associated with the computing terminal; and
   calculating, based on a number of members in the set of location information, a confidence factor for the determined location of the computing terminal.

3. The computer-implemented method of claim 2, further comprising:
   storing the determined location of the computing terminal and the confidence factor.

4. The computer-implemented method of claim 2, wherein the calculating of the confidence factor is further based on a calculated deviation between location information of the members of the set.

5. The computer-implemented method of claim 1, wherein the location information further includes attribute information relating to the transaction.

6. The computer-implemented method of claim 1, wherein determining the location of the computing terminal comprises:
   clustering, based on associated attribute information, members of the set of location information;
   identifying, based on the clustering, a centroid; and
   utilizing the centroid as the determined location of the computing terminal.

7. The computer-implemented method of claim 1, further comprising:
   determining that a stored location of the computing terminal differs from the determined location of the computing terminal; and
   replacing the stored location of the computing terminal with the determined location of the mobile device.

8. The computer-implemented method of claim 1, further comprising:
   determining that a confidence factor associated with a stored location of the computing terminal is lower than a confidence factor associated the determined location of the computing terminal; and updating the stored location of the computing terminal with the determined location of the computing terminal.

9. The computer-implemented method of claim 1, further comprising determining, based on the determined location, a street address associated with the computing terminal, wherein the second merchant data comprises the street address.

10. A device configured to automatically register point-of-sale systems with a merchant, the device comprising:

one or more processors; and memory configured to store computer instructions that, when executed by the one or more processors, cause the device to:

receive, from a computing terminal, information indicating the completion of a transaction associated with a mobile device, wherein the computing terminal stores first merchant data associated with a first merchant;

send, to the mobile device, a confirmation of the completion of the transaction;

receive, from the mobile device, location information determined via a global positioning system of the mobile device, wherein the location information includes latitude and longitude information;

store, at a database, the location information as part of a set of location information that is associated with the computing terminal;

determine, based on the set of location information, a location of the computing terminal;

update a stored location of the computing terminal with the determined location of the computing terminal;

determine that the computing terminal stores data corresponding to an incorrect merchant by identifying, based on the location of the computing terminal, a second merchant that is different from the first merchant; and transmit, to the computing terminal, instructions that cause the computing terminal to replace the first merchant data stored by the computing terminal by causing the computing terminal to store second merchant data associated with the second merchant.

11. The device of claim 10, wherein the computing instructions further cause the device to determine the location of the computing terminal by:

clustering, based on associated attribute information, members of the set of location information;

identifying, based on the clustering, a centroid; and utilizing the centroid as the determined location of the computing terminal.

12. The device of claim 10, wherein the location information further includes attribute information relating to the transaction.

13. The device of claim 10, wherein the computer instructions further cause the device to determine that the stored location of the computing terminal differs from the determined location of the computing terminal.

14. The device of claim 13, wherein the computer instructions further cause the device to determine that a confidence factor associated with a stored location of the computing terminal is lower than a confidence factor associated with the determined location of the computing terminal.

15. The device of claim 14, wherein the stored computer instructions further cause the device to calculate a confidence factor associated with the determined location of the mobile device.

16. A non-transitory computer readable medium storing computer instruction that, when executed by one or more processors, cause automatic registering of point-of-sale systems with a merchant by causing performance of actions comprising:

receiving, from a computing terminal, information indicating the completion of a transaction associated with a mobile device, wherein the computing terminal stores first merchant data associated with a first merchant;

sending, to the mobile device, a confirmation of the completion of the transaction;

receiving, from the mobile device, location information determined via a global positioning system of the mobile device, wherein the location information includes latitude and longitude information;

confirming that the location information is within a predetermined distance of a stored location of the computing terminal;

storing, at a database, the location information as part of a set of location information that is associated with the computing terminal;

determining, based on the set of location information that is associated with the computing terminal, a location of the computing terminal;

calculating, based on a number of members in the set of location information, a confidence factor for the determined location of the computing terminal; and determining that the computing terminal stores data corresponding to an incorrect merchant by determining that a confidence factor for the stored location of the computing terminal is lower than the confidence factor for the determined location of the computing terminal;

in response to determining that the computing terminal stores data corresponding to an incorrect merchant:

updating the stored location of the computing terminal with the determined location of the computing terminal;

identifying, based on the location of the computing terminal, a second merchant that is different from the first merchant; and transmitting, to the computing terminal, instructions that cause the computing terminal to replace the first merchant data stored by the computing terminal by causing the computing terminal to store second merchant data associated with the second merchant.

17. The non-transitory computer readable medium of claim 16, wherein the computer instructions are further configured to cause the calculating of the confidence factor based on a calculated deviation between location information of the members of the set.

18. The non-transitory computer readable medium of claim 16, wherein the computer instructions are further configured to cause determining that a stored location of the computing terminal differs from the determined location of the computing terminal.

19. The non-transitory computer readable medium of claim 16, wherein the location information further includes attribute information relating to the transaction.

20. The non-transitory computer readable medium of claim 19, wherein the computer instructions are further configured to cause determining of the location of the computing terminal by:

clustering, based on associated attribute information, members of the set of location information; and identifying, based on the clustering, a centroid.

\* \* \* \* \*